(12) United States Patent
Deng et al.

(10) Patent No.: US 11,457,305 B2
(45) Date of Patent: Sep. 27, 2022

(54) RECEIVER MODULE AND TERMINAL DEVICE

(71) Applicant: VIVO MOBILE COMMUNICATION CO., LTD., Guangdong (CN)

(72) Inventors: Daoquan Deng, Guangdong (CN); Fengliang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/144,330

(22) Filed: Jan. 8, 2021

(65) Prior Publication Data

US 2021/0127198 A1  Apr. 29, 2021

Related U.S. Application Data

(63) Continuation of application No. PCT/CN2019/094483, filed on Jul. 3, 2019.

(30) Foreign Application Priority Data

Jul. 10, 2018 (CN) .......................... 201810751694.0

(51) Int. Cl.
*H04R 1/28* (2006.01)
*H04B 1/08* (2006.01)
(Continued)

(52) U.S. Cl.
CPC ........... *H04R 1/288* (2013.01); *G06F 1/1684* (2013.01); *H04B 1/086* (2013.01); *H04R 1/025* (2013.01)

(58) Field of Classification Search
CPC ....... H04R 1/288; H04R 1/025; G06F 1/1684; H04B 1/086
(Continued)

(56) References Cited

U.S. PATENT DOCUMENTS 8,891,805 B2 *  11/2014  Han .......................... H04R 1/34
                                                                381/387
9,602,914 B2 *  3/2017  Shedletsky .......... H04R 1/2834
(Continued)

FOREIGN PATENT DOCUMENTS

CN      201369811 Y1    12/2009
CN      104580612 A      4/2015
(Continued)

OTHER PUBLICATIONS

Office Action Received for CN Patent Application No. 201810751694.0 dated Feb. 6, 2020, 8 pages and 9 pages of English Translation.
(Continued)

*Primary Examiner* — Sean H Nguyen
(74) *Attorney, Agent, or Firm* — Brooks Kushman P.C.

(57) ABSTRACT

A receiver module and a terminal device are provided. The receiver module includes a housing, a receiver, a drive assembly and a soundproofing assembly, where the housing is internally provided with an accommodating space, the receiver is arranged in the accommodating space, and the housing and the receiver fit together to form a sound cavity, a sound-emitting side of the receiver facing towards the sound cavity; the housing is provided with a first sound-emitting hole and a second sound-emitting hole; the drive assembly and the soundproofing assembly are connected, and the drive assembly is configured to drive the soundproofing assembly to be in a first state or a second state.

20 Claims, 7 Drawing Sheets

(51) Int. Cl.
  *H04R 1/02* (2006.01)
  *G06F 1/16* (2006.01)

(58) Field of Classification Search
  USPC .......................................................... 381/354
  See application file for complete search history.

(56) References Cited

U.S. PATENT DOCUMENTS

| | | |
|---|---|---|
| 2004/0203996 A1 | 10/2004 | Hansson |
| 2009/0137268 A1* | 5/2009 | Fukazawa ............... H04R 1/345 |
| | | 455/566 |
| 2013/0216082 A1 | 8/2013 | Kishinami et al. |
| 2018/0278735 A1 | 9/2018 | Zheng et al. |
| 2018/0288220 A1 | 10/2018 | Yin et al. |
| 2021/0127198 A1 | 4/2021 | Deng et al. |

FOREIGN PATENT DOCUMENTS

| | | |
|---|---|---|
| CN | 106162467 A | 11/2016 |
| CN | 106302875 A | 1/2017 |
| CN | 205912252 U | 1/2017 |
| CN | 106953990 A | 7/2017 |
| CN | 106973170 A | 7/2017 |
| CN | 206932272 U | 1/2018 |
| CN | 108965522 A | 12/2018 |
| EP | 2913987 A1 | 9/2015 |
| JP | 2013197818 A | 9/2013 |

OTHER PUBLICATIONS

ISR and Written Opinion received for PCT Application No. PCT/CN2019/094483, dated Jan. 21, 2021, 9 pages and 7 pages of English Translation.

Extended European Search Report dated Jul. 1, 2021 issued in PCT/CN2019/094483.

* cited by examiner

RECEIVER MODULE AND TERMINAL DEVICE

CROSS-REFERENCE TO RELATED APPLICATIONS

The application is a continuation application of PCT Application No. PCT/CN2019/094483 filed on Jul. 3, 2019, which claims priority to Chinese Patent Application No. 201810751694.0, filed in China on Jul. 10, 2018, the disclosures which are incorporated herein by reference in their entireties.

TECHNICAL FIELD

Embodiments of this disclosure relate to the field of communications technologies, and in particular, to a receiver module and a terminal device.

BACKGROUND

As communication technologies develop, smartphones, tablet computers and other terminal devices are becoming increasingly popular and have become an indispensable part in people's daily routines. People also have increasing requirements on terminal devices, especially on voice call of terminal devices. In some cases, a user may require that two different positions of a terminal device should each be provided with one receiver, such that the receivers at different positions are used in different scenarios to produce sound, so as to implement calls.

For example, two receivers are disposed inside a dual-screen terminal device and the two receivers are in one-to-one correspondence to the two display screens. When a user uses one display screen for a call, the receiver corresponding to that display screen is started to work.

However, in a case in which two receivers are mounted in a terminal device, limitations for mounting other components on a main circuit board inside the terminal device will be thus caused because both the receivers need to respectively occupy mounting space on the main circuit board inside the dual-screen terminal device. It can be seen that at present, to enable a terminal device to produce sound at two different positions, there exists a problem of occupying large mounting space on a main circuit board due to mounting of two receivers.

SUMMARY

According to a first aspect, an embodiment of this disclosure provides a receiver module, including a housing, a receiver, a drive assembly and a soundproofing assembly, where the housing is internally provided with an accommodating space, the receiver is arranged in the accommodating space, and the housing and the receiver fit together to form a sound cavity, a sound-emitting side of the receiver facing towards the sound cavity;

the housing is provided with a first sound-emitting hole and a second sound-emitting hole; and the drive assembly and the soundproofing assembly are connected and the drive assembly is configured to drive the soundproofing assembly to be in a first state or a second state, where when the soundproofing assembly is in the first state, the second sound-emitting hole is in communication with the sound cavity and the soundproofing assembly blocks off the first sound-emitting hole from the sound cavity; and when the soundproofing assembly is in the second state, the first sound-emitting hole is in communication with the sound cavity and the soundproofing assembly blocks off the second sound-emitting hole from the sound cavity.

According to a second aspect, an embodiment of this disclosure further provides a terminal device, including the foregoing receiver module.

In the embodiments of this disclosure, a receiver module includes a housing, a receiver, a drive assembly and a soundproofing assembly, where the housing is internally provided with an accommodating space, the receiver is arranged in the accommodating space, and the housing and the receiver fit together to form a sound cavity, a sound-emitting side of the receiver facing towards the sound cavity; the housing is provided with a first sound-emitting hole and a second sound-emitting hole; the drive assembly and the soundproofing assembly are connected, and the drive assembly is configured to drive the soundproofing assembly to be in a first state or a second state; where when the soundproofing assembly is in the first state, the second sound-emitting hole is in communication with the sound cavity, and the soundproofing assembly blocks off the first sound-emitting hole from the sound cavity; and when the soundproofing assembly is in the second state, the first sound-emitting hole is in communication with the sound cavity, and the soundproofing assembly blocks off the second sound-emitting hole from the sound cavity.

BRIEF DESCRIPTION OF THE DRAWINGS

To describe the technical solutions in embodiments of this disclosure more clearly, the following briefly describes the accompanying drawings required for describing the embodiments of this disclosure. Obviously, the accompanying drawings described below are merely some embodiments of this disclosure. A person of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings. Apparently, the described embodiments are merely some rather than all of the embodiments of this disclosure. Based on the embodiments of this disclosure, all other embodiments derived by a person of ordinary skill in the art without creative efforts belong to the protection scope of this disclosure.

Figure 1:
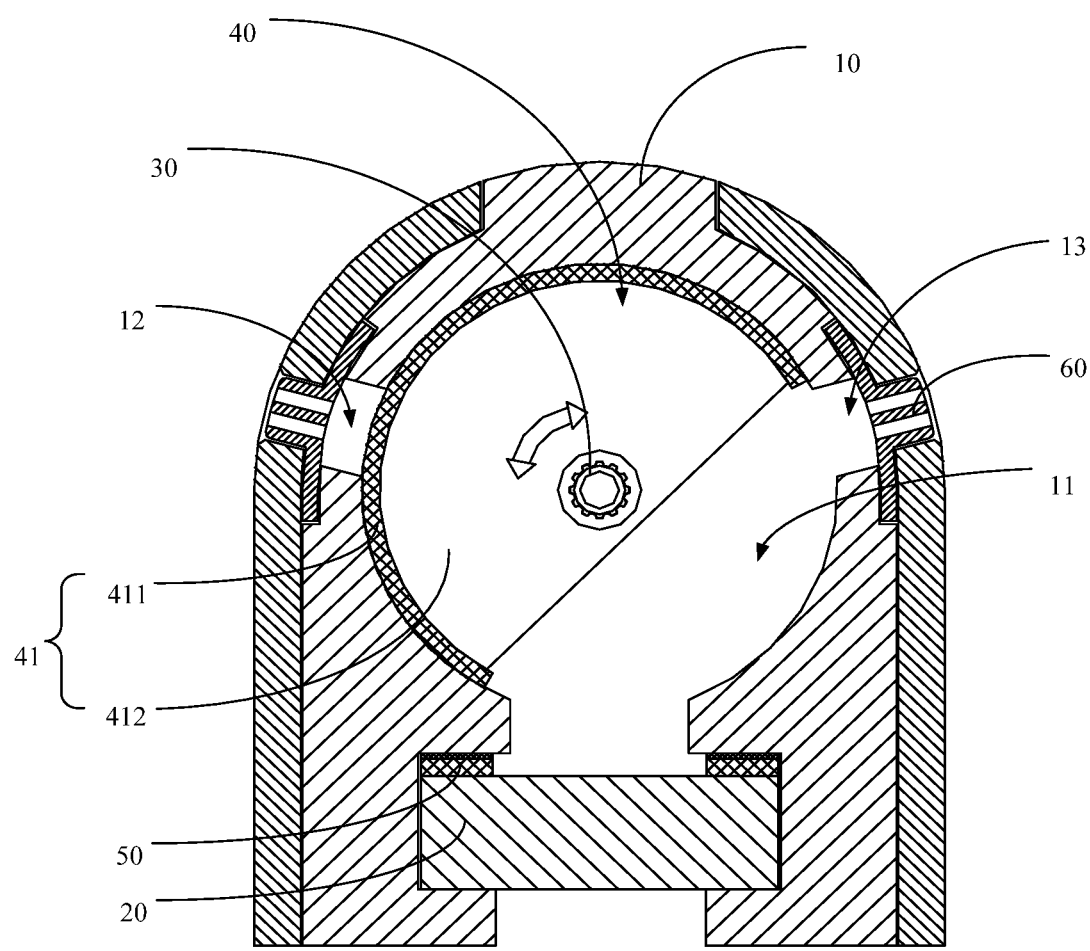
FIG. 1 is a first schematic diagram of a cross-section structure of a receiver module according to an embodiment of this disclosure.
Figure 2:
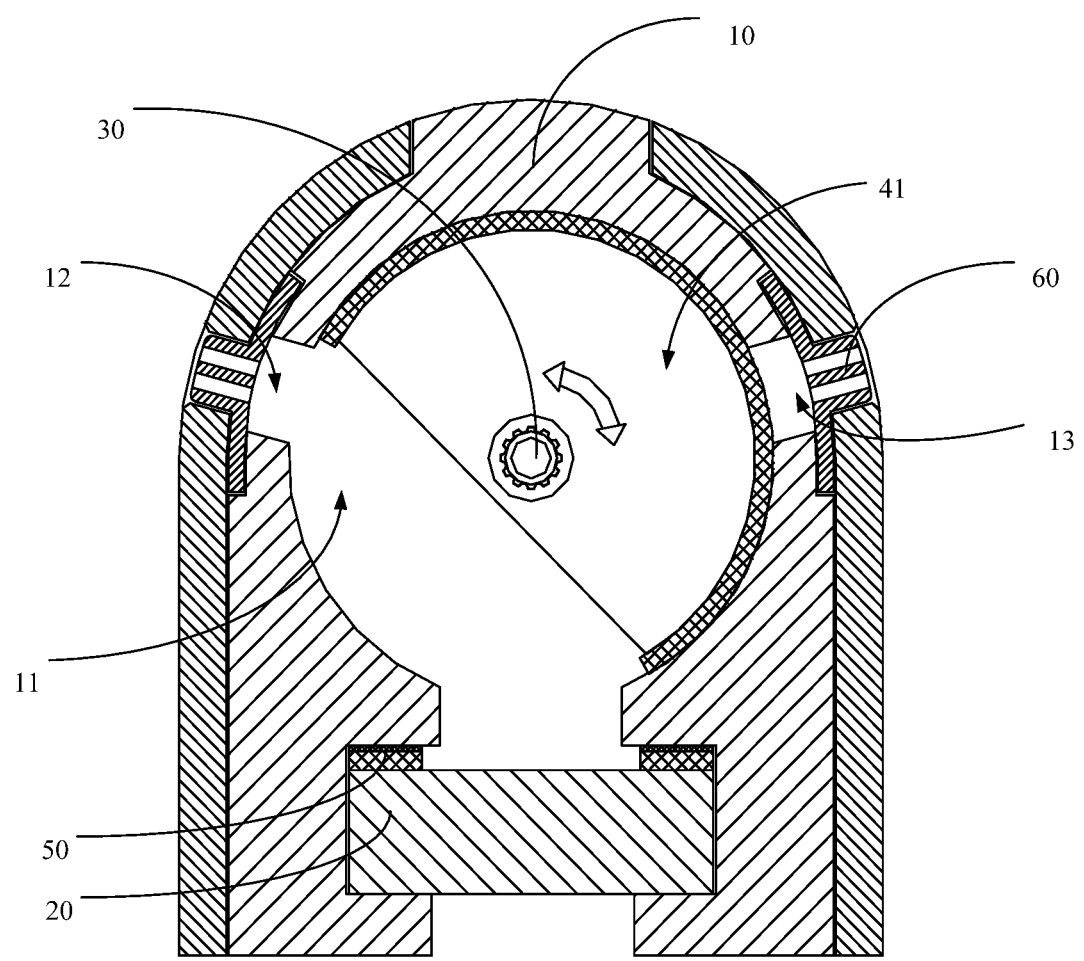
FIG. 2 is a second schematic diagram of a cross-section structure of a receiver module according to an embodiment of this disclosure.

Referring to FIG. 1 and FIG. 2, a receiver module includes a housing 10, a receiver 20, a drive assembly 30 and a soundproofing assembly 40.

The housing 10 is internally provided with an accommodating space, the receiver 20 is arranged in the accommodating space, and the housing 10 and the receiver 20 fit together to form a sound cavity 11, a sound-emitting side of the receiver 20 facing towards the sound cavity 11.

The housing 10 is provided with a first sound-emitting hole 12 and a second sound-emitting hole 13.

The drive assembly 30 and the soundproofing assembly 40 are connected, and the drive assembly 30 is configured to drive the soundproofing assembly 40 to be in a first state or a second state.

When the soundproofing assembly 40 is in the first state, the second sound-emitting hole 13 is in communication with the sound cavity 11, and the soundproofing assembly 40 blocks off the first sound-emitting hole 12 from the sound cavity 11.

When the soundproofing assembly 40 is in the second state, the first sound-emitting hole 12 is in communication with the sound cavity 11, and the soundproofing assembly 40 blocks off the second sound-emitting hole 13 from the sound cavity 11.

In this embodiment of this disclosure, when the soundproofing assembly 40 is in the first state, the second sound-emitting hole 13 is in communication with the sound cavity 11, and the soundproofing assembly 40 blocks off the first sound-emitting hole 12 from the sound cavity 11, such that sound produced by the receiver 20 is emitted via the second sound-emitting hole 13 by the sound cavity 11; and when the soundproofing assembly 40 is in the second state, the first sound-emitting hole 12 is in communication with the sound cavity 11, and the soundproofing assembly 40 blocks off the second sound-emitting hole 13 from the sound cavity 11, such that sound provided by the receiver 20 is emitted via the first sound-emitting hole 12 by the sound cavity 11. In this way, in different application scenarios, the receiver module can conduct sound produced by the receiver 20 respectively via the first sound-emitting hole 12 and the second sound-emitting hole 13.

It should be noted that the foregoing housing 10 may be a part or all of a shell of a terminal device mounted with the foregoing receiver module, or may be a structure that is independently set and does not belong to the shell of the terminal device, which is not limited herein.

The foregoing first sound-emitting hole 12 and second sound-emitting hole 13 are made into different positions on the housing 10, and the first sound-emitting hole 12 and the second sound-emitting hole 13 are each in communication with the sound cavity 11 and an exterior of the housing 10, such that the first sound-emitting hole 12 and the second sound-emitting hole 13 can conduct sound inside the sound cavity 11 to the exterior of the housing 10.

Herein, the positions of the first sound-emitting hole 12 and the second sound-emitting hole 13 made on the housing 10 may be set based on use scenarios of the terminal device by a user. For example, if the housing 10 is the shell of the terminal device, the first sound-emitting hole 12 and the second sound-emitting hole 13 can be respectively made into the top and the bottom of a same side, so that calls can be normally made when the terminal device is in upright and inverted states.

Alternatively, in a specific embodiment of this disclosure, the first sound-emitting hole 12 and the second sound-emitting hole 13 are respectively made into two side faces of the housing 10 facing away from each other, so as to enable the receiver module to produce sound in two opposite directions. For example, when a dual-screen terminal device is provided with the foregoing receiver module, the first sound-emitting hole 12 is made into a first display screen on a first side face of the housing 10, the second sound-emitting hole 13 is made into a second display screen on a second side face of the housing 10, and the first side face and the second side face are two side faces of the housing 10 facing away from each other. In this way, when the user makes a call while the first display screen of the terminal device is in work, the receiver module produces sound via the first sound-emitting hole 12; and when the user makes a call while the second display screen is in work, the receiver module produces sound via the second sound-emitting hole 13.

In this embodiment of this disclosure, the receiver 20 is arranged in the accommodating space of the housing 10, and the housing 10 and the receiver 20 fit together to form the sound cavity 11, which may be an accommodating space including a clamping slot, into which the receiver 20 is clamped. Alternatively, the receiver 20 may be connected to the housing 10 through bonding or other manners. This is not limited herein.

Additionally, the sound-emitting side of the receiver 20 faces towards the sound cavity 11, to ensure that sound produced by the receiver 20 is conducted into the sound cavity 11. In a specific embodiment of this disclosure, a sealing layer 50 is disposed at a joint of the sound-emitting side of the receiver 20 with the accommodating space. The sealing layer 50 can seal a joint between the receiver 20 and the inner wall of the housing 10, so that the sound cavity 11 becomes a closed space, thereby improving a sounding effect of the receiver module.

The sealing layer 50 may include a dustproof layer and a sealing material layer (such as a sealing foam layer) so as to improve tightness of the sound cavity 11 and implement dustproof, waterproof and other performance of the sound cavity 11.

In this embodiment of this disclosure, the drive assembly 30 is configured to drive the soundproofing assembly 40 to be in a first state or a second state, and may be partially or wholly arranged in the sound cavity 11. For example, if the drive assembly 30 is a micro motor, it may be wholly accommodated in the sound cavity 11; or a rotating shaft of the motor may extend into the sound cavity 11 and be connected to the soundproofing assembly 40, or the like.

Additionally, the soundproofing assembly 40 may be any assembly in the first state or the second state. To be specific, driven by the drive assembly 30, the soundproofing assembly 40 can block off communication between the first sound-emitting hole 12 and the sound cavity 11 and communication between the second sound-emitting hole 13 and the sound cavity 11.

In a specific embodiment of this disclosure, as shown in FIG. 1 and FIG. 2, the soundproofing assembly 40 includes a first soundproofing piece 41 fitting with an inner wall of the sound cavity 11; and the drive assembly 30 drives the first soundproofing piece 41 to rotate along the inner wall of the sound cavity 11.

The drive assembly 30 can drive the first soundproofing piece 41 to rotate along the inner wall of the sound cavity 11. To be specific, when the first soundproofing piece 41 rotates to a first angle, that is, when the soundproofing assembly 40 is in the first state, as shown in FIG. 1, the first soundproofing piece 41 blocks off communication between the first sound-emitting hole 12 and the sound cavity 11, and the second sound-emitting hole 13 is in communication with the sound cavity 11 at this moment; and when the first soundproofing piece 41 rotates to a second angle, that is, the soundproofing assembly 40 is in the second state, as shown in FIG. 2, the first soundproofing piece 41 blocks off communication between the second sound-emitting hole 13 and the sound cavity 11, and the first sound-emitting hole 12 is in communication with the sound cavity 11 at this moment. In this way, the first soundproofing piece 41 can move simply and is easy to be driven. Additionally, since the first soundproofing piece 41 always closely fits with the inner wall of the sound cavity 11, the soundproofing effect can be further improved.

It should be noted that the inner wall of the sound cavity 11 may be a surface along which the first soundproofing assembly 40 rotates, or the inner wall of the sound cavity 11 may be a cylindrical surface or all or a part of a spherical surface, or the like. The sound cavity 11 may also be set as a cylindrical cavity, a spherical cavity, or the like. This is not limited herein.

Additionally, the first soundproofing piece 41 is driven by the drive assembly 30 to rotate and the first soundproofing piece 41 can closely fit with the inner wall of the sound cavity 11. For example, the first soundproofing piece 41 can include a soundproofing material layer and a plurality of support rods and the soundproofing material layer can bear some stress, then the plurality of support rods support the first soundproofing piece 41 at a plurality of position points and the drive assembly 30 drives the soundproofing material layer to rotate via the plurality of support rods.

Alternatively, in a specific embodiment of this disclosure, the first soundproofing piece 41 includes a soundproofing block 411 and a fan-shaped connecting plate 412, an arc-shaped edge of the fan-shaped connecting plate 412 being connected to the soundproofing block 411; the soundproofing block 411 fits with the inner wall of the sound cavity 11, and the drive assembly 30 drives the soundproofing block 411 through the fan-shaped connecting plate 412 to rotate along the inner wall of the sound cavity 11; and a peripheral direction of the fan-shaped connecting plate 412 is the same as a rotating direction of the soundproofing block 411.

In this implementation, the arc-shaped edge of the fan-shaped connecting plate 412 is connected to the soundproofing block 411 (such as a soundproofing block made of sealing foam) and the peripheral direction of the fan-shaped connecting plate 412 is the same as the rotating direction of the soundproofing block 411. Therefore, when the soundproofing block 411 rotates, the fan-shaped connecting plate 412 can provide large and uniform support force for the soundproofing block 411, enabling the soundproofing block 411 to more tightly fit with the inner wall of the sound cavity 11, and enabling the first soundproofing piece 41 to better block off the first sound-emitting hole 12 from the sound cavity 11, and the second sound-emitting hole 13 from the sound cavity 11.

The drive assembly 30 drives the soundproofing block 411 to rotate through the fan-shaped connecting plate 412. The fan-shaped connecting plate 412 may be connected to a rotation shaft of the drive assembly 30. When the rotation shaft of the drive assembly 30 rotates, the fan-shaped connecting plate 412 drives the soundproofing piece 411 to rotate under the effect of the rotation shaft. Moreover, a position at which the rotation shaft and the fan-shaped connecting plate 412 are connected can be set depending on actual requirements. This is not limited herein.

Figure 3:
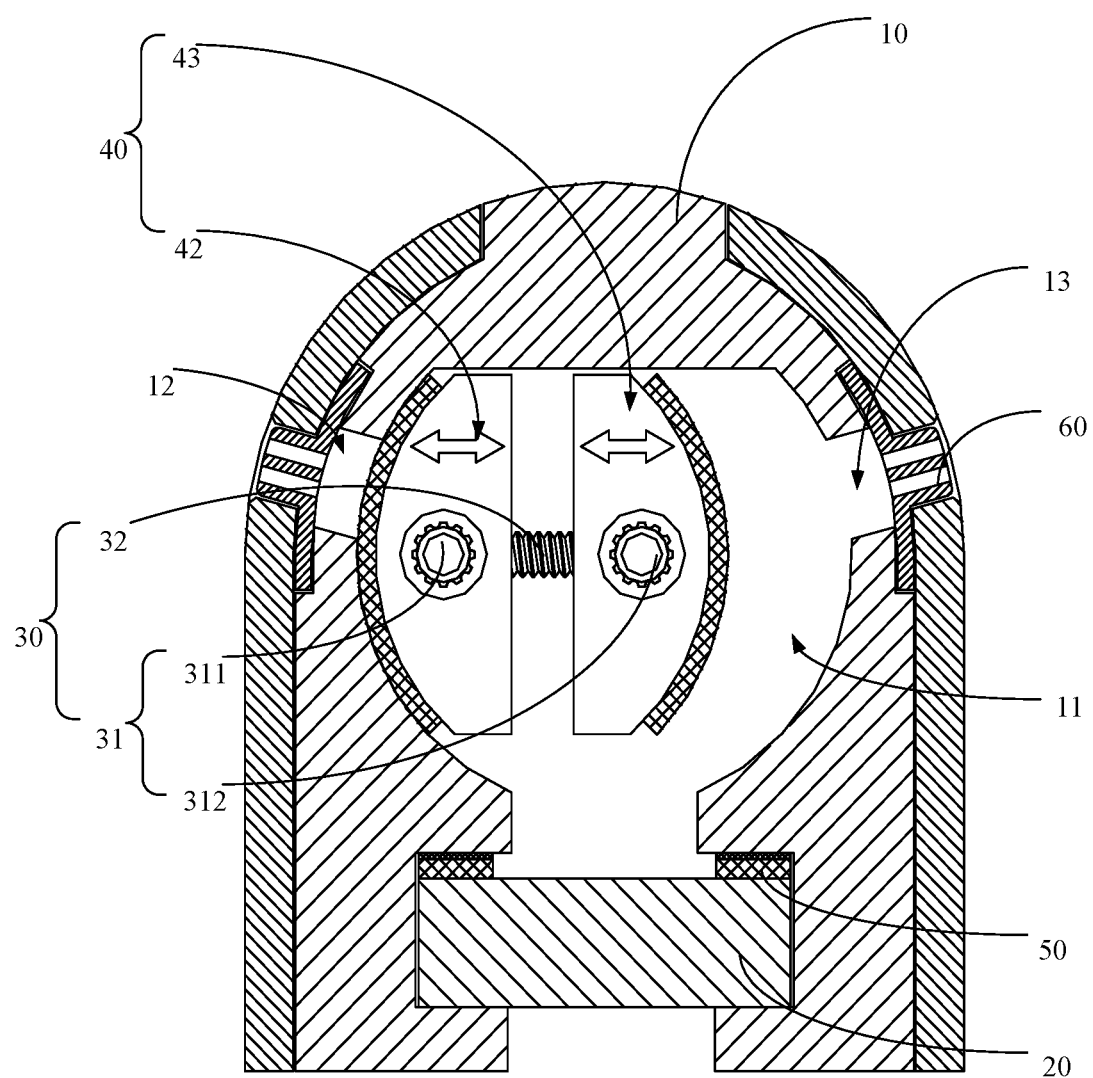
FIG. 3 is a third schematic diagram of a cross-section structure of a receiver module according to an embodiment of this disclosure.
Figure 4:
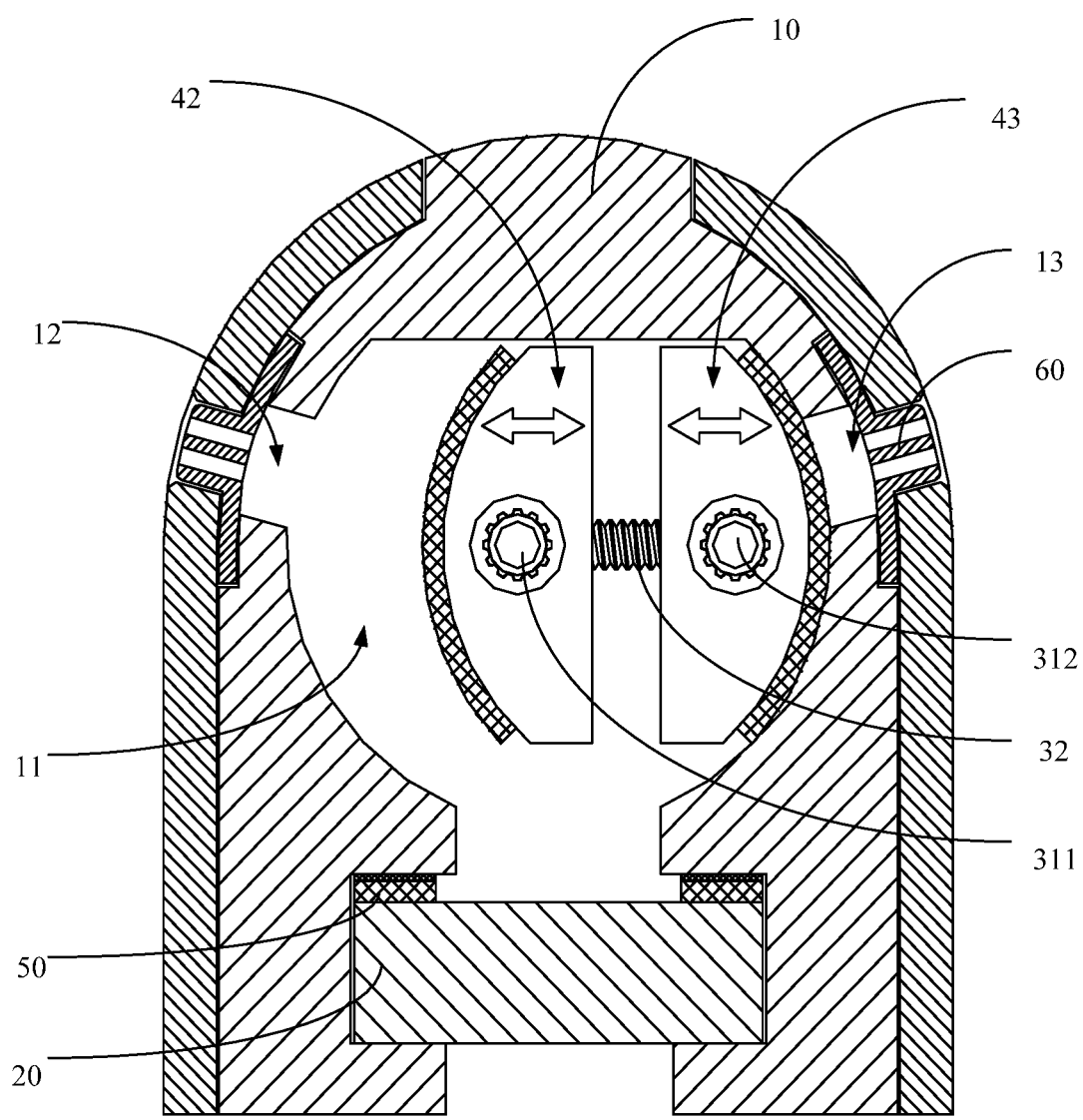
FIG. 4 is a fourth schematic diagram of a cross-section structure of a receiver module according to an embodiment of this disclosure.

In a specific embodiment of this disclosure, as shown in FIG. 3 and FIG. 4, the drive assembly 30 includes a drive piece 31 and a transmission shaft 32, the drive piece 31 and the soundproofing assembly 40 being connected and the drive piece 31 driving the soundproofing assembly 40 to rotate along the transmission shaft 32.

When the soundproofing assembly 40 moves to a first position of the transmission shaft 32, the soundproofing assembly 40 is in the first state.

When the soundproofing assembly 40 moves to a second position of the transmission shaft 32, the soundproofing assembly 40 is in the second state.

Herein, the drive piece 31 can drive the soundproofing assembly 40 to move along the transmission shaft 32, so that the soundproofing assembly 40 blocks off communication between the first sound-emitting hole 12 and the sound cavity 11 and communication between the second sound-emitting hole 13 and the sound cavity 11 when moving to different positions on the transmission shaft 32. The movement manner is simple and easy to implement, making the structure of the receiver module simple.

It should be noted that the drive assembly 30 may be any structure that can drive the soundproofing assembly 40 to move along its transmission shaft 32. For example, the drive assembly 30 includes a lead screw and a lead screw stepping motor movably connected to the lead screw. The soundproofing assembly 40 is connected to the lead screw stepping motor and the lead screw stepping motor drives the soundproofing assembly 40 to move left and right along the lead screw, and so on.

Additionally, the soundproofing assembly 40 is driven by the drive piece 31 to move to the first position and the second position along the transmission shaft 32, and it may be an overall structure driven to move by one drive motor (such as a lead screw stepping motor). Alternatively, in a specific embodiment of this disclosure, the drive piece 31 includes a first drive motor 311 and a second drive motor 312, and the soundproofing assembly 40 includes a second soundproofing piece 42 and a third soundproofing piece 43.

The second soundproofing piece 42 is connected to the first drive motor 311, the first drive motor 311 being configured to drive the second soundproofing piece 42 to move along the transmission shaft 32.

The third soundproofing piece 43 is connected to the second drive motor 312, the second drive motor 312 being configured to drive the third soundproofing piece 43 to move along the transmission shaft 32.

In this implementation, the first drive motor 311 can drive the second soundproofing piece 42 to move along the transmission shaft 32, and the second drive motor 312 can drive the third soundproofing piece 43 to move along the transmission shaft 32. In this way, when the first drive motor 311 drives the second soundproofing piece 42 to fit with the inner wall of the sound cavity 11 and the second drive motor 312 drives the third soundproofing piece 43 to be spaced apart from the inner wall of the sound cavity 11, the soundproofing assembly 40 moves to the first position, that is, the soundproofing assembly 40 is in the first state, as shown in FIG. 3; and when the first drive motor 311 drives the second soundproofing piece 42 to be spaced apart from the inner wall of the sound cavity 11 and the second drive motor 312 drives the third soundproofing piece 43 to fit with the inner wall of the sound cavity 11, the soundproofing assembly 40 moves to the second position, that is, the soundproofing assembly 40 is in the second state, as shown in FIG. 4. This supports more flexible movement manners for the soundproofing assembly 40 and allows more diverse structures of the receiver module.

It should be noted that the first drive motor 311 drives the second soundproofing piece 42 to move and the second drive motor 312 drives the third soundproofing piece 43 to move, which may be that the second soundproofing piece 42 and the third soundproofing piece 43 move along a same transmission shaft 32; or the drive assembly 30 is provided with two transmission shafts 32 and the second soundproofing piece 42 and the third soundproofing piece 43 are driven by the corresponding drive motors to move along different transmission shafts 32. This is not limited herein.

Additionally, in a case in which the soundproofing assembly 40 moves along the transmission shaft 32, the inner wall of the sound cavity 11 with which the soundproofing assembly 40 comes into contact may be set as a flat contact surface. For example, when the sound cavity 11 is set as a rectangular cavity and the first sound-emitting hole 12 and the second sound-emitting hole 13 are each made into any one inner wall of the rectangular cavity; or the inner wall of the sound cavity 11 with which the soundproofing assembly 40 comes into contact may be set as an arc-shaped inner wall, such as the sound cavity 11 being a cylindrical cavity or a spherical cavity, such that the soundproofing assembly 40 can come into closer contact with the inner wall of the sound cavity 11, further improving the soundproofing effect.

It should be noted that the structures of the second soundproofing piece 42 and the third soundproofing piece 43 may be the same as or differ from the composition structure of the first soundproofing piece 41. This is not limited herein.

Certainly, the foregoing embodiments only describe the case in which the soundproofing assembly 40 is driven by the drive assembly 30 to be in the first state and the second state. In a specific embodiment of this disclosure, the drive assembly 30 is further configured to drive the soundproofing assembly 40 to be in a third state.

When the soundproofing assembly 40 is in the third state, the soundproofing assembly 40 blocks off the first sound-emitting hole 12 from the sound cavity 11, and blocks off the second sound-emitting hole 13 from the sound cavity 11.

Herein, the drive assembly 30 may further drive the soundproofing assembly 40 to be in the third state, to enable the soundproofing assembly 40 to block off communication between the first sound-emitting hole 12 and the sound cavity 11 and communication between the second sound-emitting hole 13 and the sound cavity 11, so as to block off communication between the sound cavity 11 and the exterior when the receiver 20 does not work, that is, does not produce sound. This prevents external liquid, dust, or the like from entering the sound cavity 11, thereby improving the stability of the receiver module.

Figure 5:
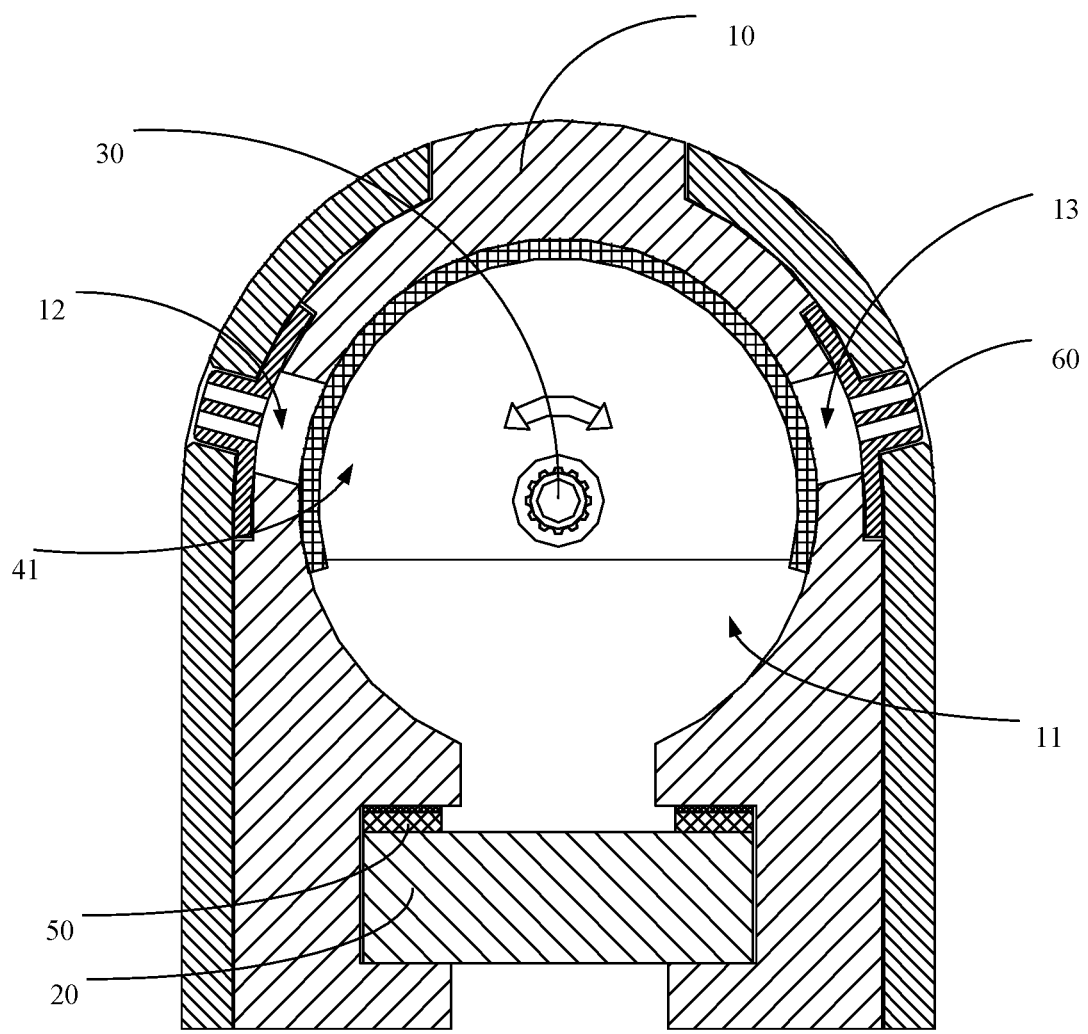
FIG. 5 is a fifth schematic diagram of a cross-section structure of a receiver module according to an embodiment of this disclosure.
Figure 6:
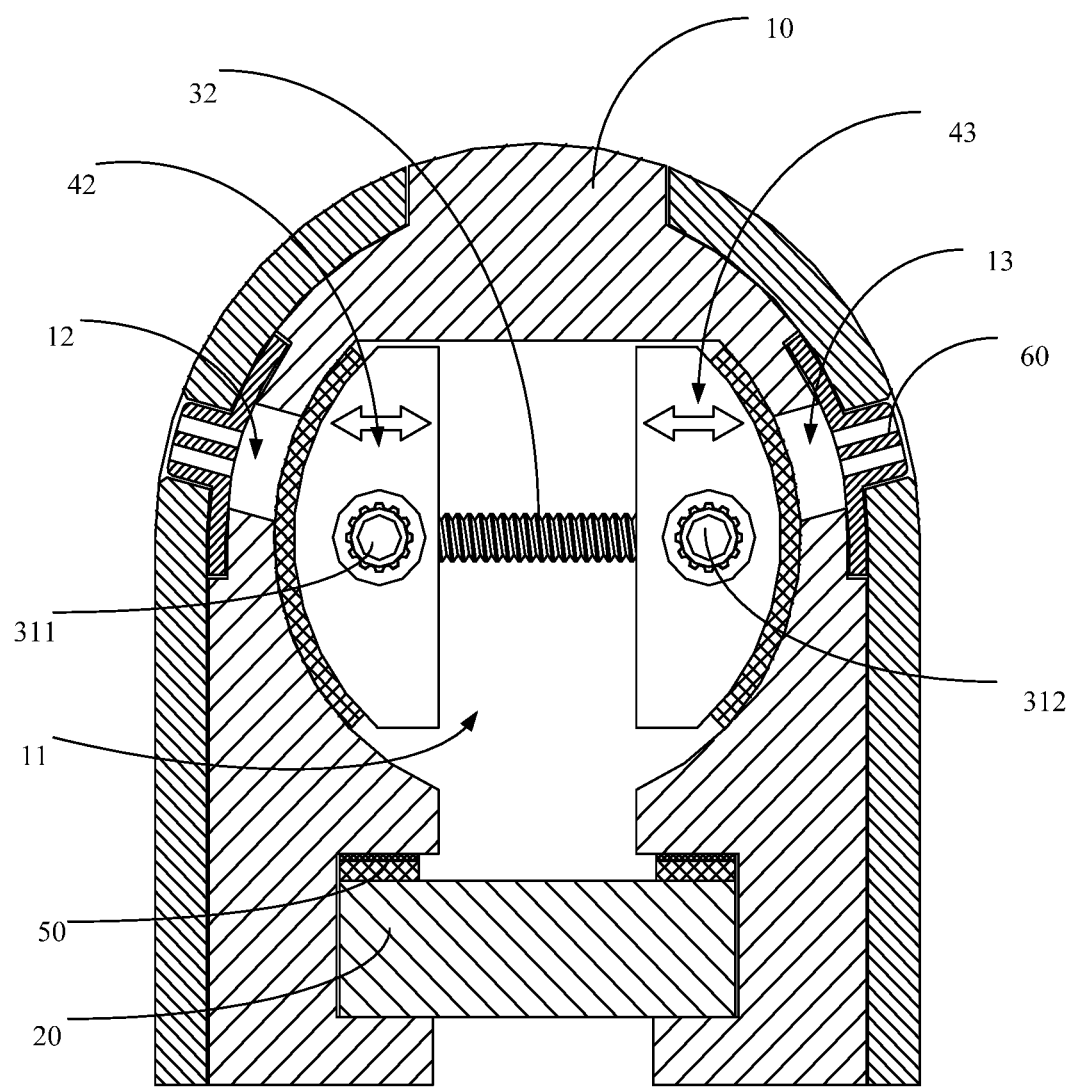
FIG. 6 is a sixth schematic diagram of a cross-section structure of a receiver module according to an embodiment of this disclosure.

The drive assembly 30 can drive the soundproofing assembly 40 to be in the third state. For example, in the receiver module shown in FIG. 1 and FIG. 2, when the drive assembly 30 drives the first soundproofing assembly 40 to rotate to a third angle, the first soundproofing assembly 40 can simultaneously block off the first sound-emitting hole 12 and the second sound-emitting hole 13 from the sound cavity 11, as shown in FIG. 5. Alternatively, in the receiver module shown in FIG. 3 and FIG. 4, when the first drive motor 311 drives the second soundproofing piece 42 to fit with the inner wall of the sound cavity 11 and the second drive motor 312 drives the third soundproofing piece 43 to fit with the inner wall of the sound cavity 11, the second soundproofing piece 42 blocks off communication between the first soundproofing hole 12 and the sound cavity 11 and the third soundproofing piece 43 blocks off communication between the second sound-emitting hole 13 and the sound cavity 11, as shown in FIG. 6.

Additionally, the soundproofing assembly 40 may be any structure that can block off communication between the first sound-emitting hole 12 and the sound cavity 11 and communication between the second sound-emitting hole 13 and the sound cavity 11. In a specific embodiment of this disclosure, the soundproofing assembly 40 is a soundproofing assembly 40 formed by a sealing material (such as sealing foam), further improving the sealing performance of the soundproofing assembly 40, and improving the sound effect and waterproof, dustproof and other performance of the receiver module.

In a specific embodiment of this disclosure, the drive assembly 30 may be further configured to drive the soundproofing assembly 40 to be in a fourth state.

When the soundproofing assembly 40 is in the fourth state, the first sound-emitting hole 12 is in communication with the sound cavity 11 and the second sound-emitting hole 13 is in communication with the sound cavity 11.

Herein, the drive assembly 30 can drive the soundproofing assembly 40 to be in the fourth state, and the first sound-emitting hole 12 and the second sound-emitting hole 13 are both in communication with the sound cavity 11 at this moment. When the receiver 20 produces sound, the first sound-emitting hole 12 and the second sound-emitting hole 13 can simultaneously conduct the sound produced by the receiver 20 to the exterior, thereby improving the sound effect and satisfying use requirements of the user in a particular scenario.

Figure 7:
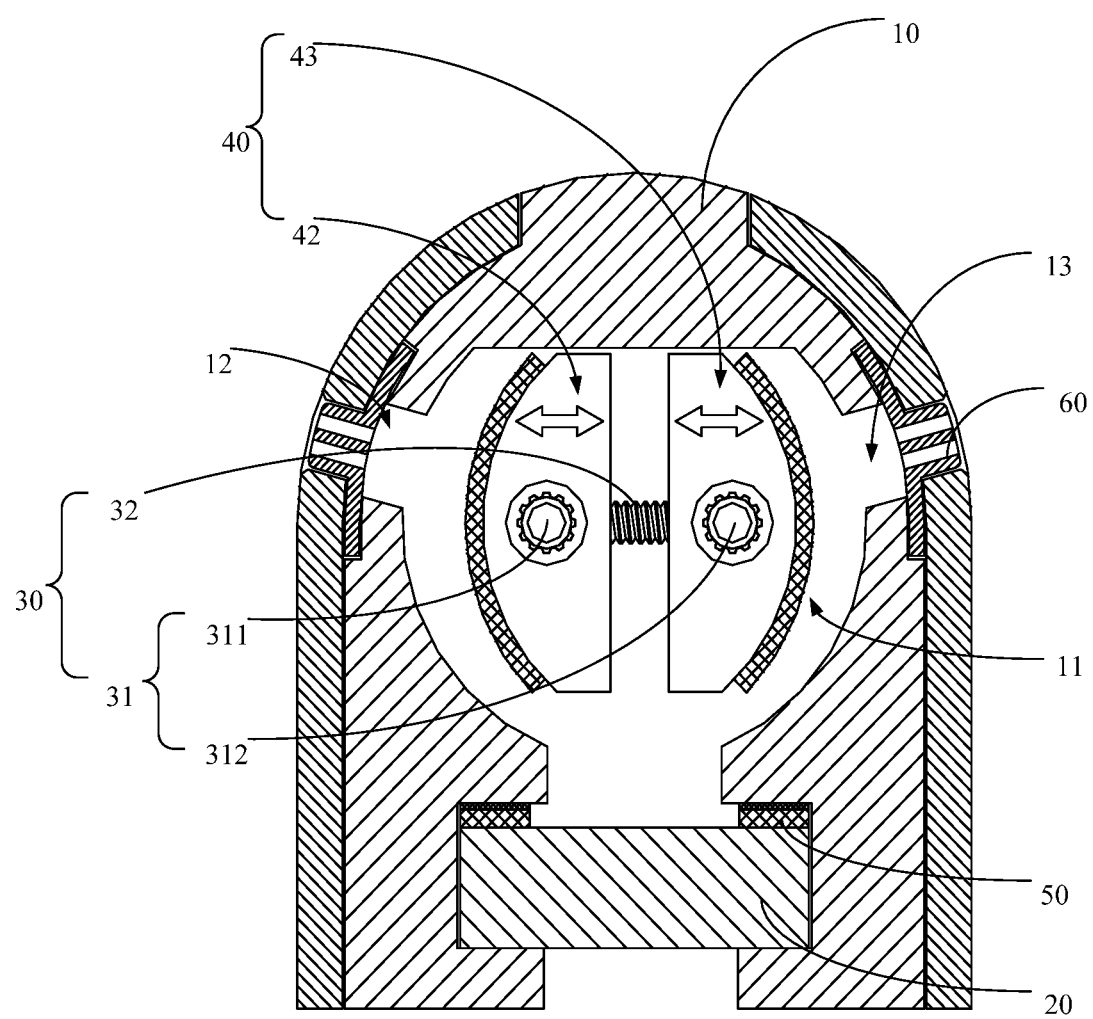
FIG. 7 is a seventh schematic diagram of a cross-section structure of a receiver module according to an embodiment of this disclosure.

For example, as shown in FIG. 7, when the first drive motor 311 drives the second sound-emitting piece 42 to be spaced apart from the inner wall of the sound cavity 11 and the second drive motor 312 drives the third soundproofing piece 43 to be spaced apart from the inner wall of the sound cavity 11, the first sound-emitting hole 12 is in communication with the sound cavity 11 and the second sound-emitting hole 13 is in communication with the sound cavity 11. At this moment, the soundproofing assembly 40 moves to a third position, that is, the soundproofing assembly 40 is in the fourth state.

Certainly, the receiver module may further include other assemblies to improve performance of the receiver module. In a specific embodiment of this disclosure, the first sound-emitting hole 12 and the second sound-emitting hole 13 are each internally provided with a decorative cover 60, and the decorative cover 60 is provided with at least one through hole which communicates the sound cavity 11 to an outer side of the housing 10. In this way, arranging the decorative covers 60 inside the first sound-emitting hole 12 and the second sound-emitting hole 13 can beautify appearance of the receiver module and thereby beautify appearance of the terminal device mounted with the receiver module.

The receiver module provided in the embodiments of this disclosure includes a housing, a receiver, a drive assembly and a soundproofing assembly, where the housing is internally provided with an accommodating space, the receiver is arranged in the accommodating space, and the housing and the receiver fit together to form a sound cavity, a sound-emitting side of the receiver facing towards the sound cavity; the housing is provided with a first sound-emitting hole and a second sound-emitting hole; the drive assembly and the soundproofing assembly are connected, and the drive assembly is configured to drive the soundproofing assembly to be in a first state or a second state; when the soundproofing assembly is in the first state, the second sound-emitting hole is in communication with the sound cavity, and the soundproofing assembly blocks off the first sound-emitting hole from the sound cavity; and when the soundproofing assembly is in the second state, the first sound-emitting hole is in communication with the sound cavity, and the soundproofing assembly blocks off the second sound-emitting hole from the sound cavity. In this way, with one receiver mounted, the receiver module can produce sound at two different positions. This can reduce mounting space occupied on a main circuit board, compared with the mounting of two receivers in the related technologies.

Based on the foregoing receiver module, an embodiment of this disclosure further provides a terminal device, including the foregoing receiver module.

The first sound-emitting hole 12 and the second sound-emitting hole 13 of the foregoing receiver module may be made into a same side of the terminal device, for example, on a display screen on a same side of the terminal device.

Certainly, the first sound-emitting hole 12 and the second sound-emitting hole 13 of the foregoing receiver module may be made into different sides of the terminal device. In a specific embodiment of this disclosure, the terminal device further includes a first display screen and a second display screen, where the first display screen and the second display screen are respectively disposed at two side faces of the housing 10 of the receiver module; and the first sound-emitting hole 12 of the receiver module is made into the first display screen and the second sound-emitting hole 13 of the receiver module is made into the second display screen. In this way, when the first display screen and the second display screen are respectively in work, the terminal device can produce sound at corresponding sides of the display screen in work through one receiver 20, reducing the mounting space of the receiver 20 occupied on a main circuit board of the terminal device.

Since a structure of a body of the terminal device belongs the related technology, and the receiver module has been described in detail in the foregoing embodiments, the specific structure of the terminal device is not repeated in this embodiment.

In the embodiment of this disclosure, the foregoing terminal device may be any terminal device provided with the foregoing receiver module, such as a mobile phone, a tablet personal computer, a laptop computer, a personal digital assistant (PDA), a mobile Internet device (MID), or a wearable device.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A receiver module, comprising a housing, a receiver, a drive assembly and a soundproofing assembly, wherein
the housing is internally provided with an accommodating space, the receiver is arranged in the accommodating space, and the housing and the receiver fit together to form a sound cavity, a sound-emitting side of the receiver facing towards the sound cavity;
the housing is provided with a first sound-emitting hole and a second sound-emitting hole; and
the drive assembly and the soundproofing assembly are connected, and the drive assembly is configured to drive the soundproofing assembly to be in a first state or a second state, wherein
when the soundproofing assembly is in the first state, the second sound-emitting hole is in communication with the sound cavity and the soundproofing assembly blocks off the first sound-emitting hole from the sound cavity; and
when the soundproofing assembly is in the second state, the first sound-emitting hole is in communication with the sound cavity and the soundproofing assembly blocks off the second sound-emitting hole from the sound cavity.

2. The receiver module according to claim 1, wherein the drive assembly is further configured to drive the soundproofing assembly to be in a third state; and
when the soundproofing assembly is in the third state, the soundproofing assembly blocks off the first sound-emitting hole from the sound cavity and blocks off the second sound-emitting hole from the sound cavity.

3. The receiver module according to claim 2, wherein the soundproofing assembly comprises a first soundproofing piece fitting with an inner wall of the sound cavity; and
the drive assembly drives the first soundproofing piece to rotate along the inner wall of the sound cavity.

4. The receiver module according to claim 2, wherein the drive assembly comprises a drive piece and a transmission shaft, the drive piece and the soundproofing assembly being connected and the drive piece driving the soundproofing assembly to rotate along the transmission shaft, wherein
when the soundproofing assembly moves to a first position of the transmission shaft, the soundproofing assembly is in the first state; and
when the soundproofing assembly moves to a second position of the transmission shaft, the soundproofing assembly is in the second state.

5. The receiver module according to claim 2, wherein a sealing layer is disposed at a joint of the sound-emitting side of the receiver with the accommodating space.

6. The receiver module according to claim 2, wherein the first sound-emitting hole and the second sound-emitting hole are respectively disposed at two opposite side faces of the housing.

7. The receiver module according to claim 1, wherein the drive assembly is further configured to drive the soundproofing assembly to be in a fourth state; and
when the soundproofing assembly is in the fourth state, the first sound-emitting hole is in communication with the sound cavity and the second sound-emitting hole is in communication with the sound cavity.

8. The receiver module according to claim 7, wherein the soundproofing assembly comprises a first soundproofing piece fitting with an inner wall of the sound cavity; and
the drive assembly drives the first soundproofing piece to rotate along the inner wall of the sound cavity.

9. The receiver module according to claim 8, wherein the drive piece comprises a first drive motor and a second drive motor, and the soundproofing assembly comprises a second soundproofing piece and a third soundproofing piece, wherein
the second soundproofing piece is connected to the first drive motor, the first drive motor being configured to drive the second soundproofing piece to move along the transmission shaft; and the third soundproofing piece is connected to the second drive motor, the second driver motor being configured to drive the third soundproofing piece to move along the transmission shaft.

10. The receiver module according to claim 7, wherein the drive assembly comprises a drive piece and a transmission shaft, the drive piece and the soundproofing assembly being connected and the drive piece driving the soundproofing assembly to rotate along the transmission shaft, wherein
   when the soundproofing assembly moves to a first position of the transmission shaft, the soundproofing assembly is in the first state; and
   when the soundproofing assembly moves to a second position of the transmission shaft, the soundproofing assembly is in the second state.

11. The receiver module according to claim 7, wherein a sealing layer is disposed at a joint of the sound-emitting side of the receiver with the accommodating space.

12. The receiver module according to claim 7, wherein the first sound-emitting hole and the second sound-emitting hole are respectively disposed at two opposite side faces of the housing.

13. The receiver module according to claim 1, wherein the soundproofing assembly comprises a first soundproofing piece fitting with an inner wall of the sound cavity; and
   the drive assembly drives the first soundproofing piece to rotate along the inner wall of the sound cavity.

14. The receiver module according to claim 13, wherein the first soundproofing piece comprises a soundproofing block and a fan-shaped connecting plate, an arc-shaped edge of the fan-shaped connecting plate being connected to the soundproofing block; the soundproofing block fits with the inner wall of the sound cavity and the drive assembly drives the soundproofing block through the fan-shaped connecting plate to rotate along the inner wall of the sound cavity; and a peripheral direction of the fan-shaped connecting plate is the same as a rotating direction of the soundproofing block.

15. The receiver module according to claim 1, wherein the drive assembly comprises a drive piece and a transmission shaft, the drive piece and the soundproofing assembly being connected and the drive piece driving the soundproofing assembly to rotate along the transmission shaft, wherein
   when the soundproofing assembly moves to a first position of the transmission shaft, the soundproofing assembly is in the first state; and
   when the soundproofing assembly moves to a second position of the transmission shaft, the soundproofing assembly is in the second state.

16. The receiver module according to claim 1, wherein a sealing layer is disposed at a joint of the sound-emitting side of the receiver with the accommodating space.

17. The receiver module according to claim 1, wherein the first sound-emitting hole and the second sound-emitting hole are respectively disposed at two opposite side faces of the housing.

18. The receiver module according to claim 1, wherein the first sound-emitting hole and the second sound-emitting hole are each internally provided with a decorative cover and the decorative cover is provided with at least one through hole which communicates the sound cavity to an outer side of the housing.

19. A terminal device, comprising the receiver module according to claim 1.

20. The terminal device according to claim 19, further comprising a first display screen and a second display screen, wherein the first display screen and the second display screen are respectively disposed at two side faces of the housing of the receiver module; and the first sound-emitting hole of the receiver module is made into the first display screen and the second sound-emitting hole of the receiver module is made into the second display screen.

* * * * *